(No Model.)  3 Sheets—Sheet 1.

A. N. PEARSON.
WIRE NETTING.

No. 403,774. Patented May 21 1889.

Witnesses:
J. Thomson Cross
Phil. E. Rouzee

Inventor:
Alfred Naylor Pearson
per Henry Orth
Attorney (No Model.) 3 Sheets—Sheet 2.
A. N. PEARSON.
WIRE NETTING.

No. 403,774. Patented May 21 1889.

Witnesses:
J. Thomson Cross
Will E. Couzee

Inventor
Alfred Naylor Pearson.
per Henry Orth
Att'y.

(No Model.) 3 Sheets—Sheet 3.

A. N. PEARSON.
WIRE NETTING.

No. 403,774. Patented May 21 1889.

Witnesses:

Inventor:
Alfred Naylor Pearson
per
Atty.

UNITED STATES PATENT OFFICE.

ALFRED NAYLOR PEARSON, OF NORTHCOTE, VICTORIA.

WIRE-NETTING.

SPECIFICATION forming part of Letters Patent No. 403,774, dated May 21, 1889.

Application filed December 5, 1888. Serial No. 292,721. (No model.)

*To all whom it may concern:*

Be it known that I, ALFRED NAYLOR PEARSON, agricultural chemist, a subject of the Queen of Great Britain, residing at Cunningham Street, Northcote, in the British Colony of Victoria, have invented new and useful Improvements in Wire Fences, of which the following is a specification.

Figure 1:
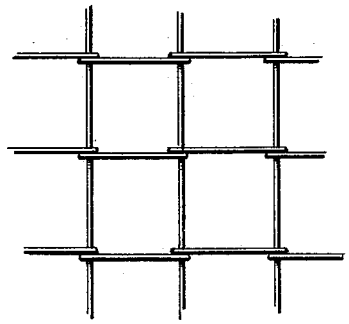
Figure 2:
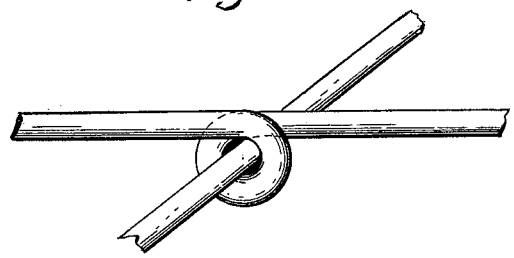
Figure 3:
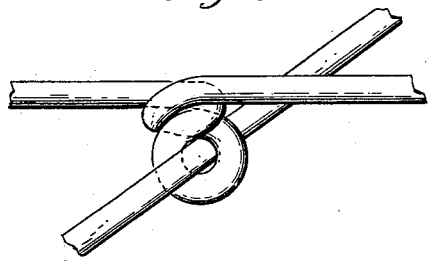
Figure 4:
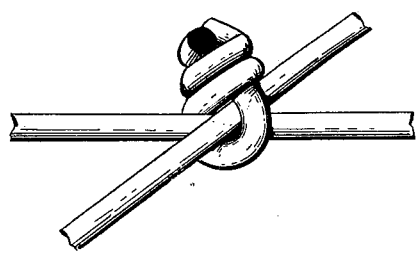
Figure 5:
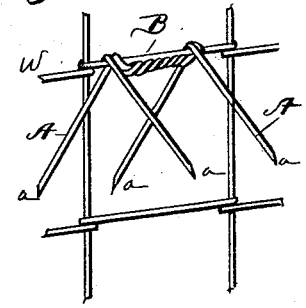
Figure 6:
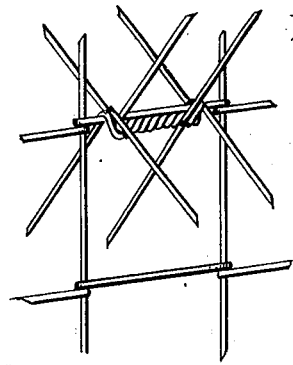
Figure 7:
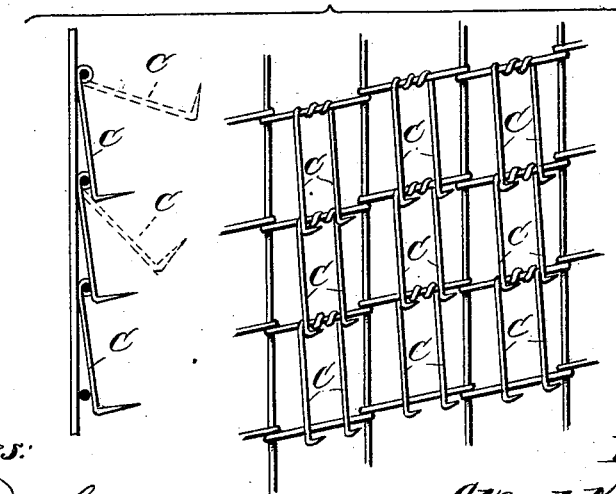
Figure 8:
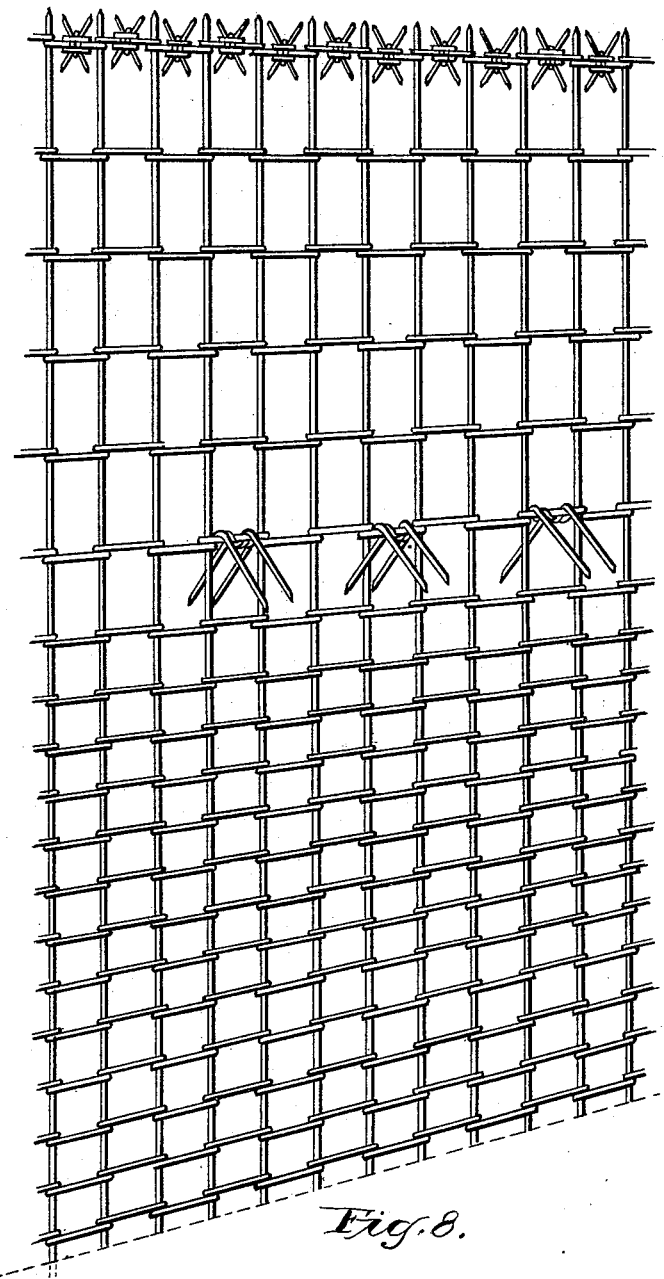

Figure 1 is a face view of a portion or section of wire-netting made with a square mesh. Figs. 2, 3, and 4 are isometric views illustrating certain modes of tying the wires of the netting at the points of crossing. Figs. 5 and 6 illustrate the mode of subdividing the meshes of the netting and forming traps by means of swinging barbs. Fig. 7 illustrates a modification in the arrangement and construction of the swinging subdividing-barbs, and Fig. 8 shows a fence made of wire-netting of varying mesh.

This invention of improvements in wire fences has been devised mainly for the purpose of providing a wire-netting whereby rabbit-proof fencing can be more cheaply erected, and which will also have several other advantages over the wire-netting fences now in use.

Hitherto wire-netting for fences has almost invariably been made of a hexagonal mesh, and this, I find, is undesirable by reason of its want of rigidity as well as by reason of its requiring a larger amount of wire to cover a given area than wire-netting constructed according to my invention. In addition to this, I have devised certain simple contrivances which can be used or made part of my wire-netting for the purpose of acting as traps, in the one case for animals, such as rabbits, and in the other for birds, such as sparrows; and in further addition I have also devised a certain specific means for converting my ordinary wire-netting into barb-wire netting and for so constructing fencing from my wire-netting as to produce at one and the same time a rabbit, dog, and cattle proof fencing, as will be more readily understood on reference to the drawings hereto attached and to the further description of my invention which is hereinafter contained.

Instead of making wire-netting of a hexagonal mesh, as has almost invariably been the case hitherto, I make wire-netting preferably with a square mesh, as shown in Fig. 1 of my drawings, using what may be termed a "warp and woof" wire, and winding the one around the other at their points of intersection and crossing, as shown in Fig. 2 of my drawings.

As an alternative, the wire which is wound around may also be twisted around itself, as shown in Fig. 3 of my drawings. An alternative method of joining the two wires together is shown in Fig. 4 of my drawings, in which the wires are tied together by a separate piece around both, as clearly shown. A very simple form of trap, and which can be used in connection with the square-mesh wire-netting fence, being economically woven into it, is shown in Fig. 5, in which two pieces of wire, A A, are first twisted together to form a stem, B, the free ends of the wires being then so twisted around a cross-wire, W, as to form a pivotal connection. The ends $a\,a$ of the wires A A, projecting downwardly and in opposite directions, are sharpened to form swinging barbs, which depend from the said cross-wires at such a distance from the vertical wires W' as to subdivide the mesh formed by said horizontal and vertical wires and make it sufficiently small to prevent an animal—such, for instance, as a rabbit—passing between the barb ends $a\,a$ or between the latter and the vertical wires. It is obvious, however, that if such an animal were to pass through one of the meshes it would not be able to return without being impaled upon one or both of the barb ends $a$. Fig. 6 shows the same contrivance in duplicate.

A further modification of my invention is for the purpose of constructing a sparrow-trapping inclosure into which a bird can enter but cannot return. This is shown in Fig. 7. It consists simply of the suspended wires C C, covering the meshes of the netting and having their ends turned inward and sharpened so as to form barbs. A bird can push its way inward, but, having done so, is prevented from escaping by reason of its inability to reopen the suspended wires, and also by being warded off by the inwardly-projecting barbs. This contrivance also can be readily woven into the netting.

In the construction of fencing according to my invention it would be quite practicable, and I think desirable, to make those meshes which are above the height at which a rabbit attempts to pass through the netting larger than those below and terminating in a row of barbed meshes, or even with ordinary barbed wire fabricated as a part of the netting, so as to constitute a fence which would keep out rabbits, dogs, and cattle. This method of construction is clearly shown in Fig. 8 of my drawings.

I would have it understood that I do not confine myself to the gage of the wire or to the size of the meshes used in the manufacture of my wire-netting.

I do not desire to broadly claim a wire fence constructed with netting having a square mesh, as I am aware that this has been proposed before; but for the purposes of my invention the square-mesh wire-netting is preferred, as the stringing of additional horizontal wires for the suspension of the swinging barbs to form the traps is thus dispensed with; nor is it intended to claim, broadly, herein a wire fabric the meshes of which vary in dimension, as such fabrics have heretofore been used in the arts.

What I claim, and desire to secure by Letters Patent, is—

1. Wire-netting more especially designed for fencing, made with a square mesh, in combination with barbs pivotally connected with the cross-wires and arranged to subdivide the meshes of the netting, substantially as and for the purposes specified.

2. Wire-netting more especially designed for fencing, made with a square mesh, in combination with barbs pivotally connected with the cross-wires and arranged to project and swing in one direction only and to subdivide the meshes of the netting, substantially as and for the purposes specified.

3. In a wire fence, the combination, with the fence-posts, of an open-mesh wire fabric composed of interconnected woof and weft wires, the meshes of one portion of the fabric being smaller than those of the remaining portions, substantially as and for the purposes specified.

4. In a wire fence, the combination, with the fence-posts, of an open-mesh wire fabric composed of interconnected woof and weft wires, the meshes of the fabric being larger at the upper end of the post than at the foot thereof, substantially as and for the purposes specified.

5. A wire fence composed of wire-netting the mesh of which varies from top downward, the larger meshes being at top of the fence, in combination with barbs for the larger meshes, substantially as and for the purposes specified.

6. A wire fence composed of wire-netting the mesh of which varies from top downward, the larger meshes being at top of the fence, in combination with barbs for the larger meshes, said barbs being pivotally connected with the cross-wires and arranged to subdivide the meshes, as described.

ALFRED NAYLOR PEARSON.

Witnesses:
WALTER SMYTHE BAYSTON,
EDWD. WATERS.